United States Patent [19]

Slomcenski et al.

[11] Patent Number: 5,241,672
[45] Date of Patent: Aug. 31, 1993

[54] SYSTEM USING THE STORAGE LEVEL OF FILE UPDATES IN NONVOLATILE MEMORY TO TRIGGER SAVING OF RAM TO DISK AND USING THE FILE UPDATES TO REBOOT AFTER CRASH

[75] Inventors: Robert J. Slomcenski, Rochester; Anthony M. Federico, Webster; Ronald A. Ippolito, Rochester; Kitty Sathi; Christopher Compareta, both of Pittsford; Ernest L. Legg, Fairport; Thomas M. Frey, Rochester, all of N.Y.

[73] Assignee: Xerox Corporation, Stamford, Conn.

[21] Appl. No.: 678,508

[22] Filed: Apr. 1, 1991

[51] Int. Cl.[5] .................... G06F 15/40; G06F 13/00
[52] U.S. Cl. .................... 395/600; 395/250; 395/575; 364/DIG. 1; 364/285.1; 364/285.2; 364/285.3; 364/285.4
[58] Field of Search ............... 364/200; 395/575, 250, 395/425, 600; 371/40.1

[56] References Cited

U.S. PATENT DOCUMENTS

| | | | |
|---|---|---|---|
| 4,020,466 | 4/1977 | Cordi et al. | 395/600 |
| 4,044,337 | 8/1977 | Hicks et al. | 395/250 |
| 4,654,819 | 3/1987 | Stiffler et al. | 395/425 |
| 4,819,156 | 4/1989 | DeLorme et al. | 364/200 |
| 4,819,159 | 4/1989 | Shipley et al. | 395/575 |
| 4,937,864 | 6/1990 | Caseiras et al. | 380/4 |
| 5,008,820 | 4/1991 | Christopher, Jr. et al. | 364/200 |
| 5,086,502 | 2/1992 | Malcolm | 395/575 |
| 5,105,427 | 4/1992 | Ando | 371/40.1 |
| 5,136,707 | 8/1992 | Block et al. | 395/600 |

Primary Examiner—Thomas C. Lee
Assistant Examiner—Wayne Amsbury
Attorney, Agent, or Firm—Frederick E. McMullen

[57] ABSTRACT

An electronic printing system with plural hard disks for storing system files in which file management information is held in a Volume Allocation Table in internal system RAM memory with file management updates queued in NVM, with the contents of the Volume Allocation Table transferred to external disk memory when the queue of file management updates in NVM reaches a predetermined size.

2 Claims, 9 Drawing Sheets

SYSTEM USING THE STORAGE LEVEL OF FILE UPDATES IN NONVOLATILE MEMORY TO TRIGGER SAVING OF RAM TO DISK AND USING THE FILE UPDATES TO REBOOT AFTER CRASH

CROSS REFERENCES TO RELATED APPLICATIONS:

The present application is related to the following co-pending applications, which are assigned to the same assignee as is the present application and incorporated by reference herein: U.S. patent application Ser. No. 07/678,922, filed Apr. 1, 1991 to Mark A. Smith et al to "Process For Replacing Non-Volatile Memory in Electronic Printing Systems", now pending; U.S. patent application Ser. No. 07/678,923, filed Apr. 1, 1991 to Kitty Sathi et al, entitled "File Compaction Process For Electronic Printing Systems", now U.S. patent No. 5,212,786; U.S. patent application Ser. No. 07/678,924, filed Apr. 1, 1991 to Kitty Sathi et al to "Process For Upgrading Software In An Electronic Printing System", now pending; U.S. patent application Ser. No. 07/678,925, filed Apr. 1, 1991 to Christopher Comparetta et al to "A Process For Replacing Storage Media In Electronic Printing Systems", now pending; U.S. patent application Ser. No. 07/678,926, filed Apr. 1, 1991 to Kitty Sathi et al to "File Storage Process For Electronic Printing Systems Having Multiple Disks", now pending; and U.S. patent application Ser. No. 07/678,091, filed Apr. 1, 1991 to Ronald A. Ippolito et al to "Process For Accommodating Bad Disk Pages In An Electronic Printing System", now pending.

The invention relates to electronic printers and printing systems, and more particularly, to a file updating process for such systems.

An important task of the operating system in an electronic printing system is the maintenance of files which are permanent objects recorded on backing storage such as hard disks. A file consists of a sequence of pages, the contents of which must be preserved across system restarts. The file system provides the operating system with facilities for creating, organizing, reading, writing, modifying, copying, moving, deleting, and controlling access to the files.

An important function of the file system is storage management. This includes allocating, de-allocating, and maintaining secondary storage. It is, as will be understood, important in a system having both external and internal memory to minimize the number of accesses to external memory that are necessary to perform the storage management.

To keep track of space in the external memory, the file system needs to maintain a record of the available space on the external memory device and also to maintain a record of the space allocated to each file on the device. In the past, when a file was allocated, de-allocated, truncated, or extended, the filing system data structures were written to the external memory immediately. This results in an undesirable increase in the time required to conduct file system operations. Also, there could be a loss of file integrity if the updates to the data structures were interrupted by a system rollover while the updating process was underway.

While it is known in the prior art to store the operating software for a reproduction machine on a hard disk, as shown in U.S. Pat. No. 4,937,864 to Caseiras et al, there is no disclosure to a process for maintaining file integrity while processing file management updates in an electronic printing system having plural disks providing permanent file storage, a non-volatile memory for storing critical data, random access memory for storing selected system files or parts of system files during operation of the system, and a filing system including a volume allocation table for tracking usage of the disks, copies of the allocation table being provided on each of the disks and in the random access memory, comprising the steps of: inputting file management updates to the allocation table in random access memory to maintain the allocation table in random access memory current; copying the file management updates to the non-volatile memory; arranging the file management update copies in the non-volatile memory in a queue having a predetermined order; when the queue of file management updates in the non-volatile memory reaches a predetermined level, writing the current allocation table in the random access memory to the allocation table on the disks to update the disk allocation tables; erasing the file management updates from the non-volatile memory; and repeating the above for subsequent file management updates whereby to safeguard against loss of the file management updates in the event the system crashes while avoiding the need to write individual file management updates to the allocation tables on the disks as the file updates occur.

IN THE DRAWINGS

Figure 1:
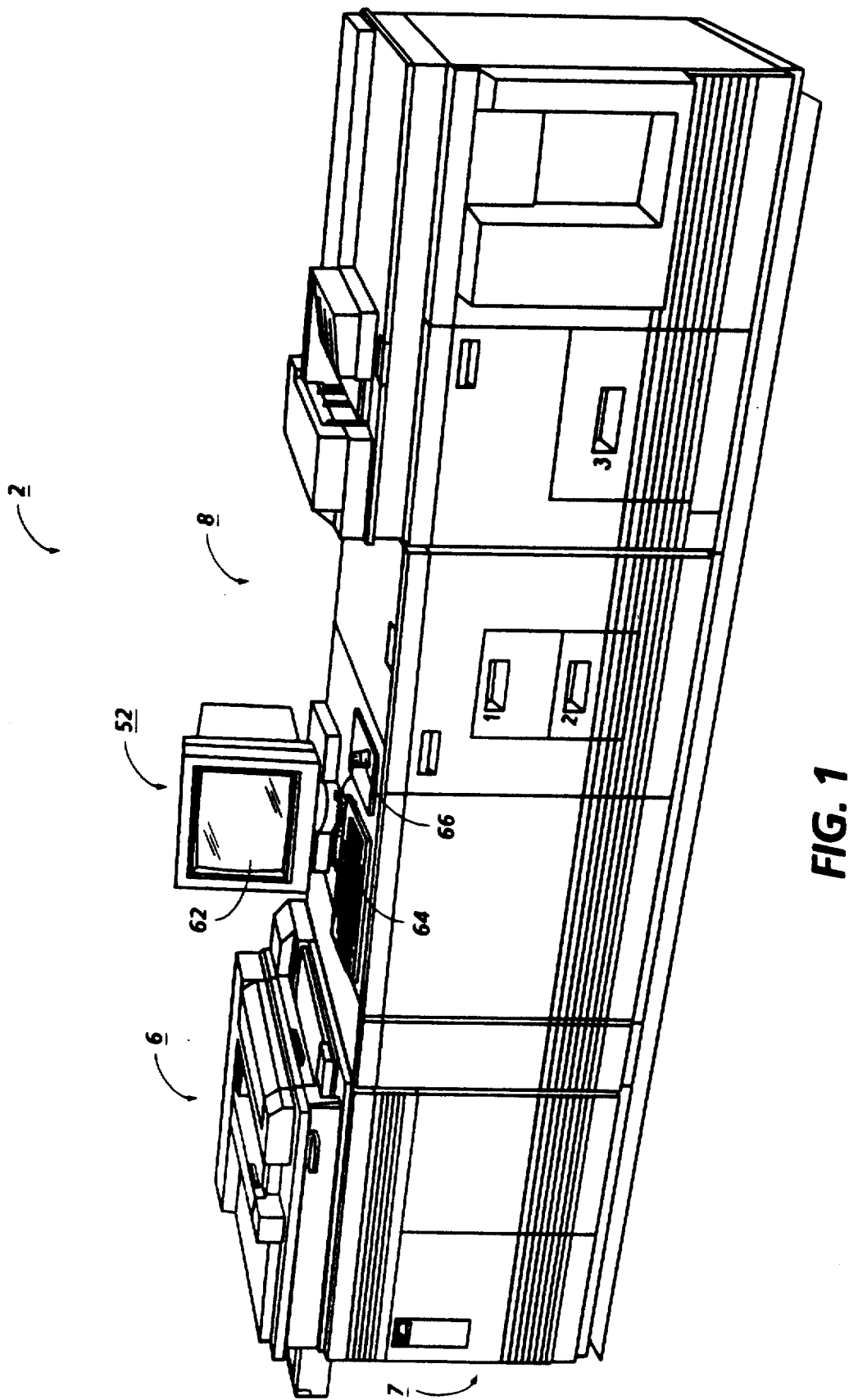
FIG. 1 is a view depicting an electronic printing system incorporating the file updating process of the present invention.
Figure 3A:
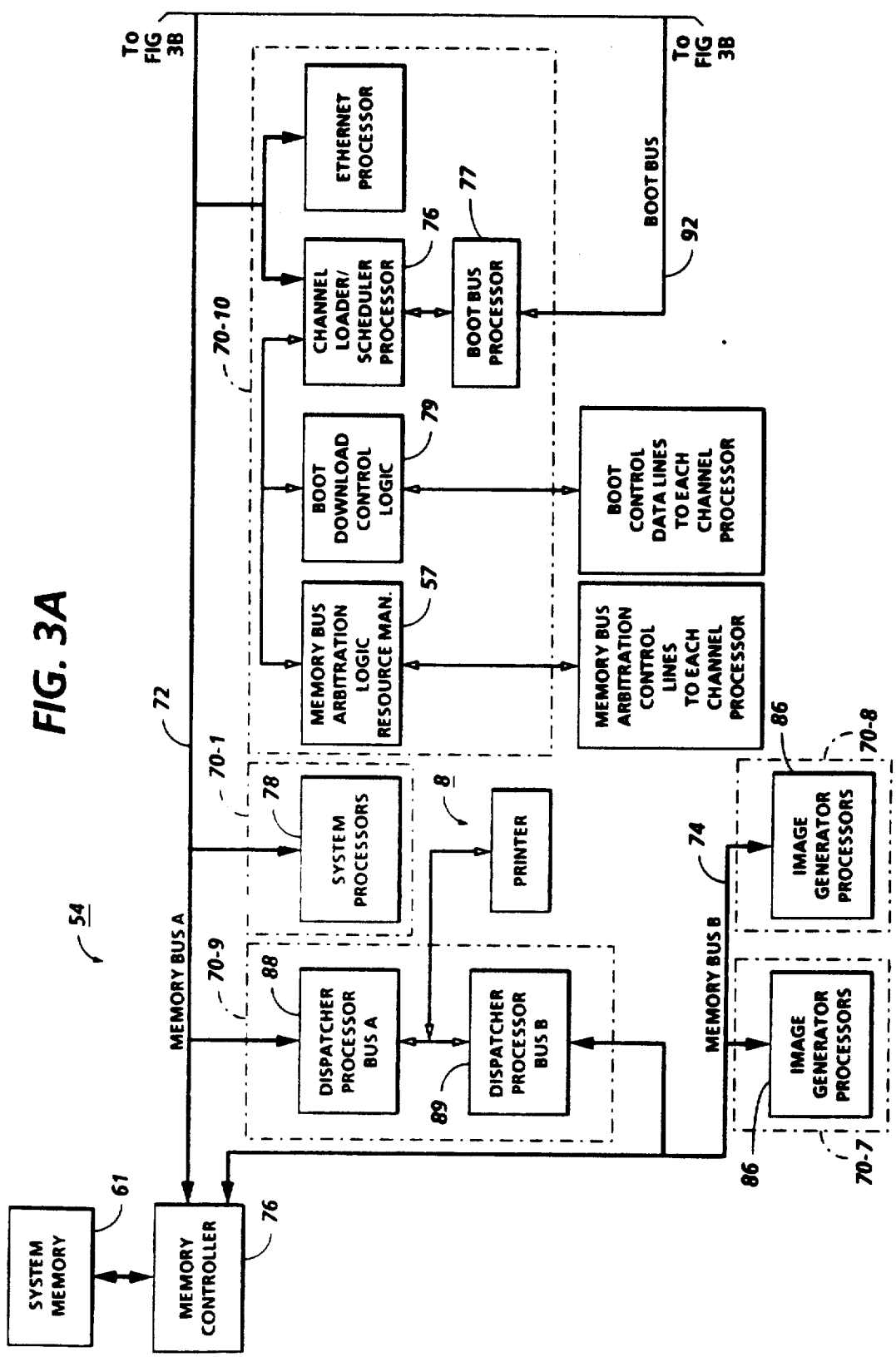
Figure 3B:
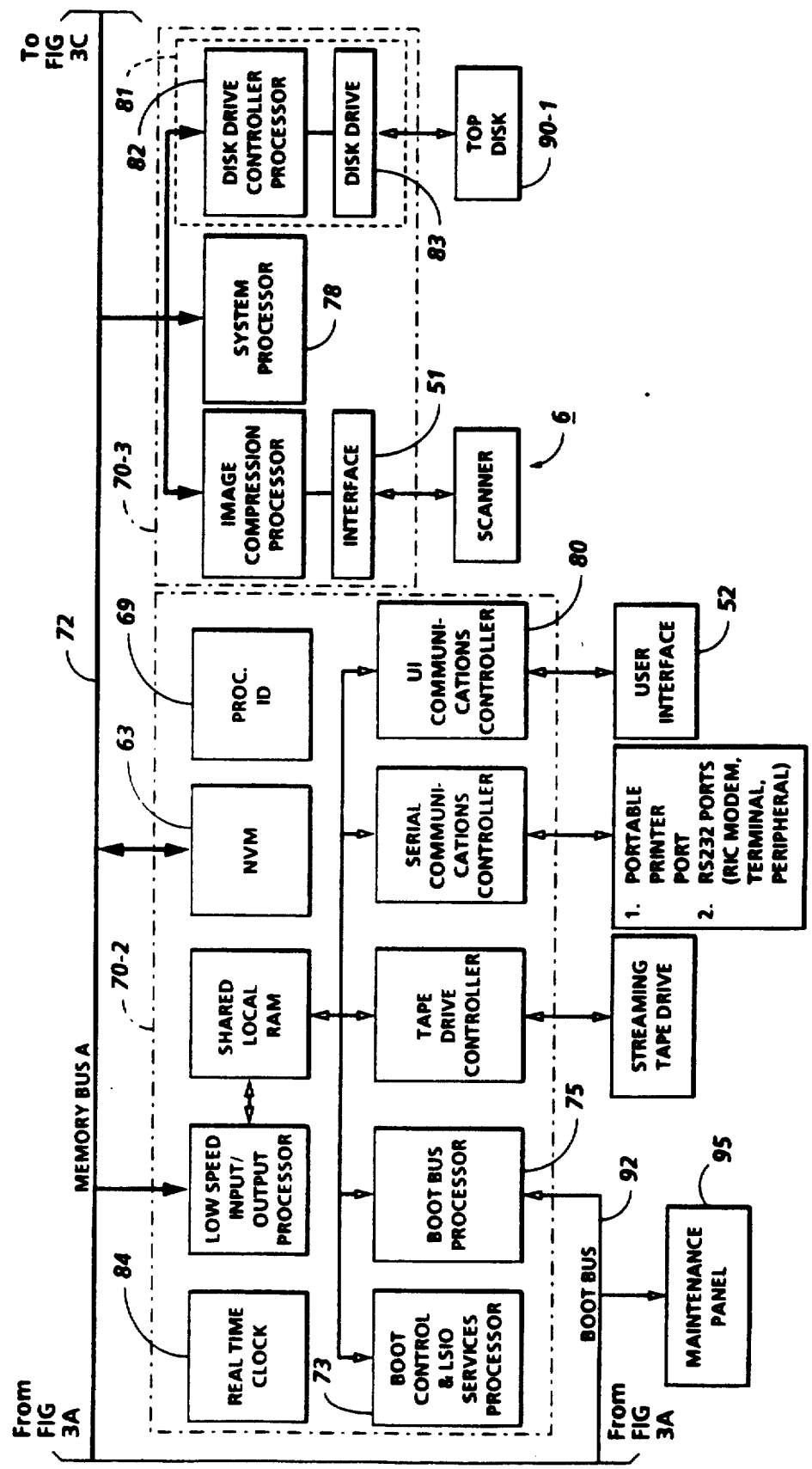
Figure 3C:
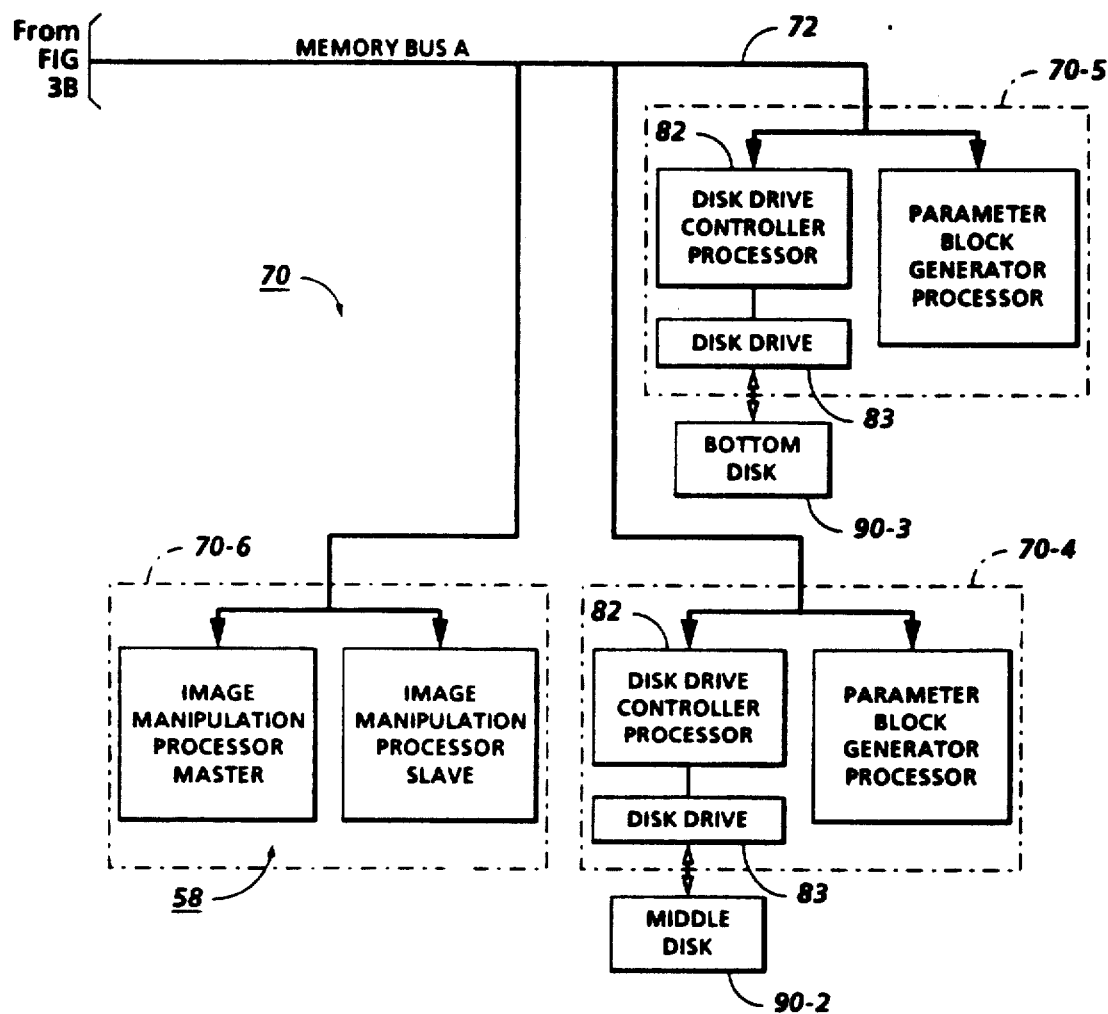
Figure 4:
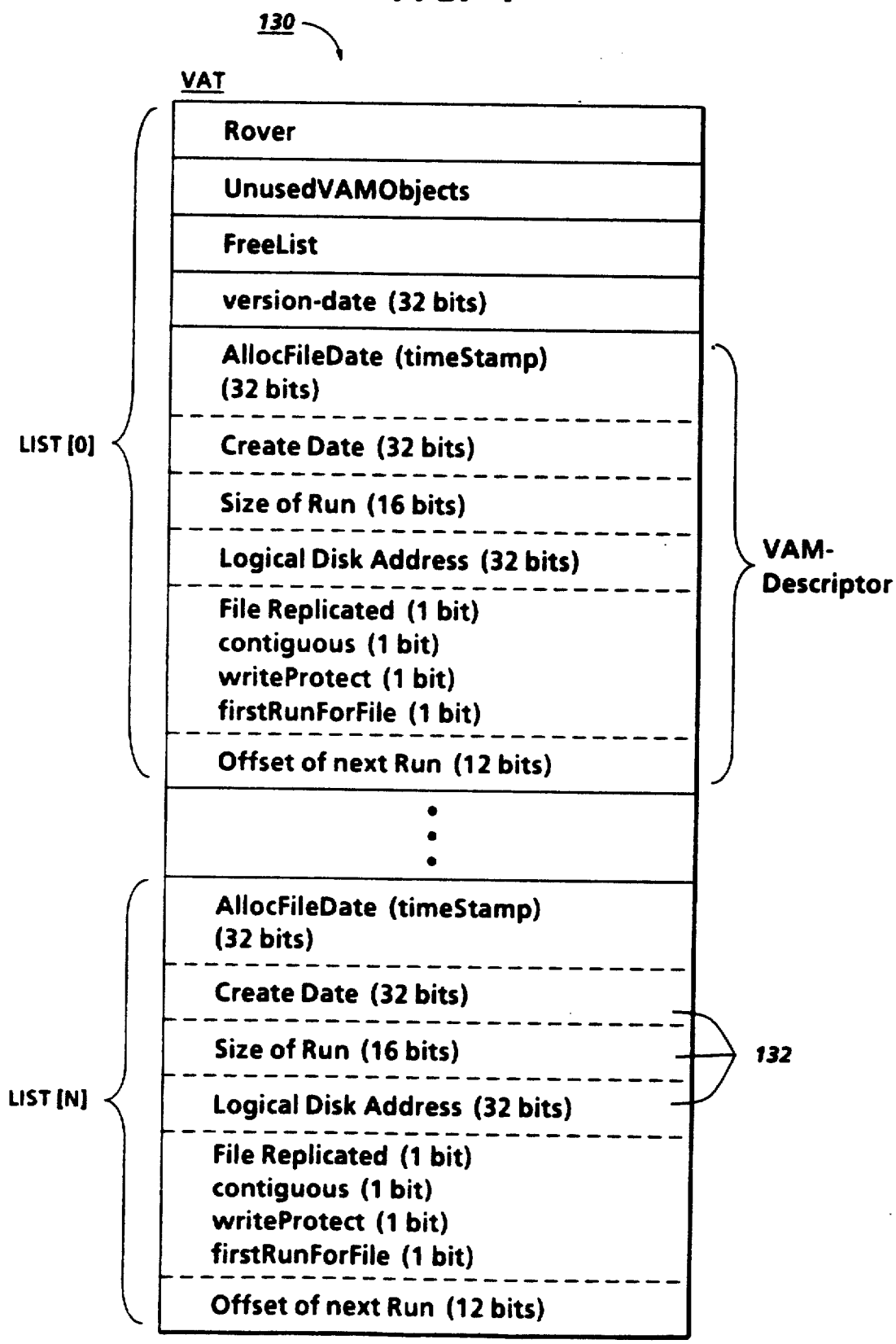
Figure 5:
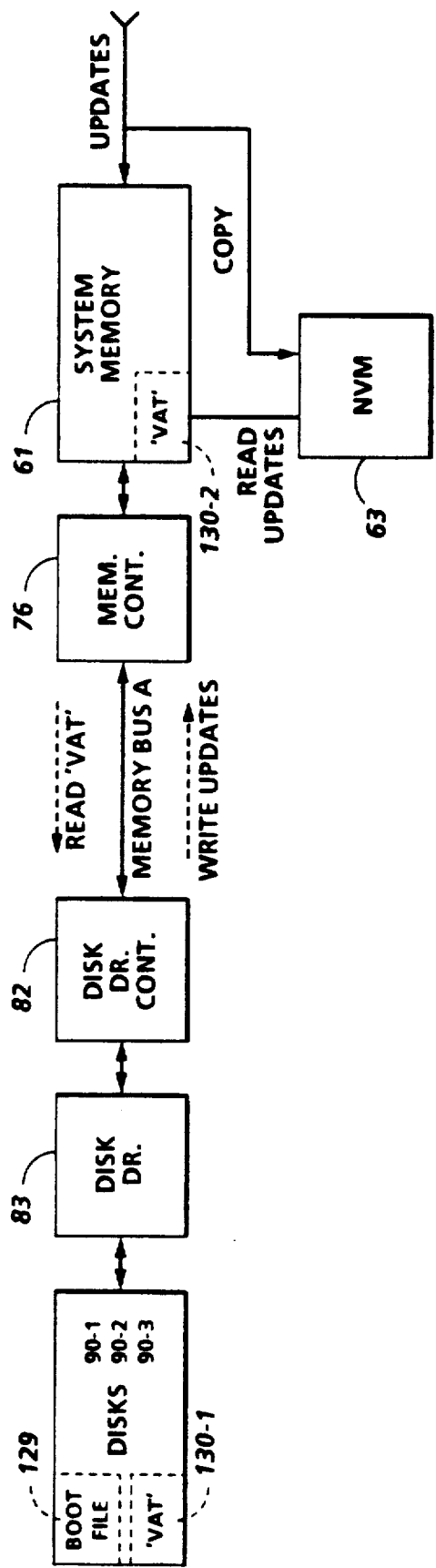
Figure 6:
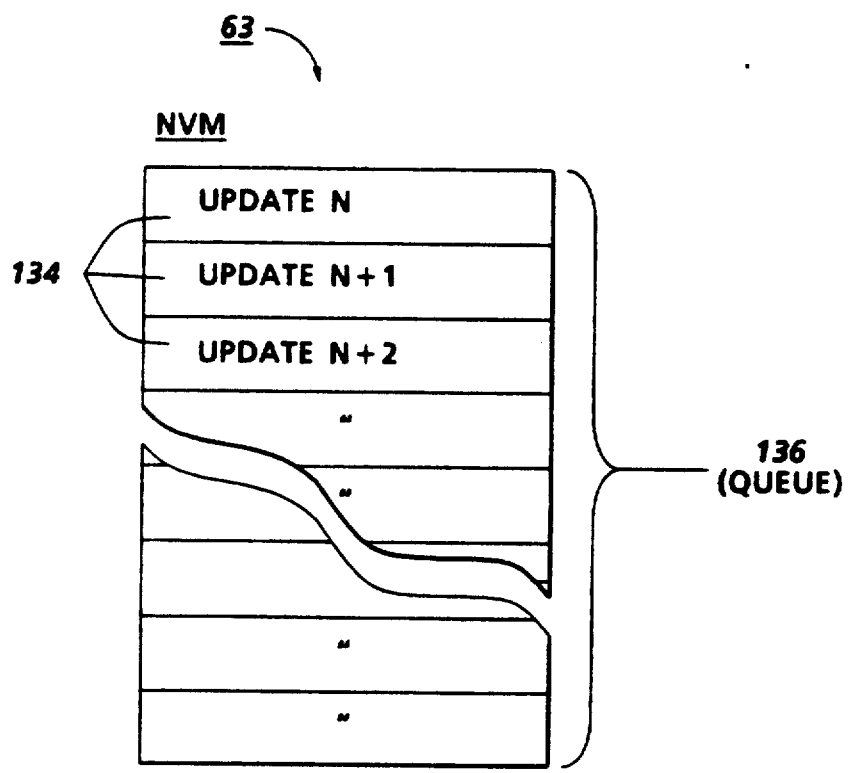

FIGS. 3A, 3B, and 3C comprise a schematic block diagram showing the major parts of the control section for the printing system shown in FIG. 1;

FIG. 4 is a schematic view depicting a Volume Allocation Table or VAT;

FIG. 5 is a block diagram illustrating details of the file updating process of the present invention;

FIG. 6 is a schematic view depicting the file update queue in NVM; and

Figure 7:
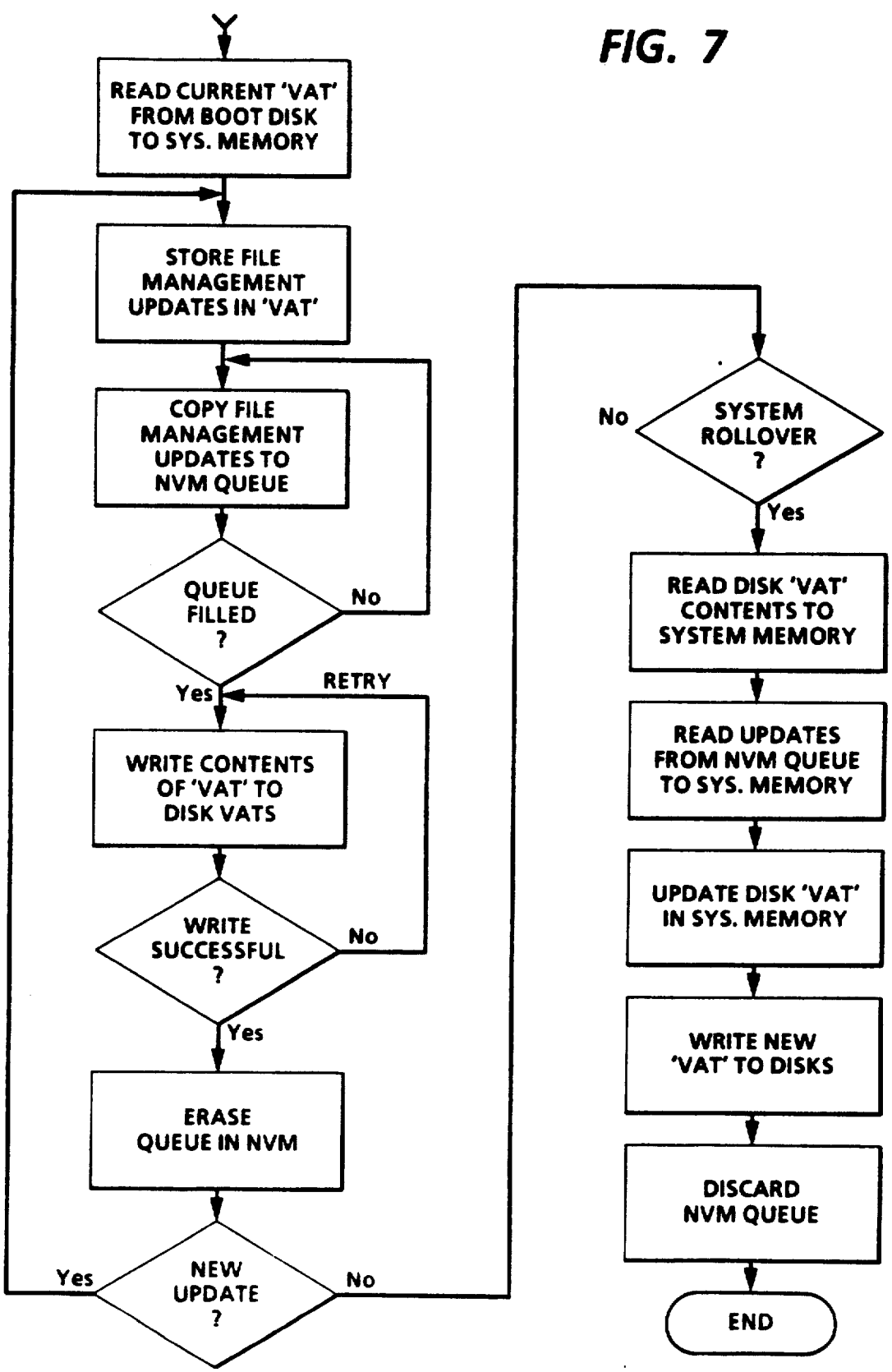

FIG. 7 is flow chart showing the process for file updating of the present invention.

Figure 2:
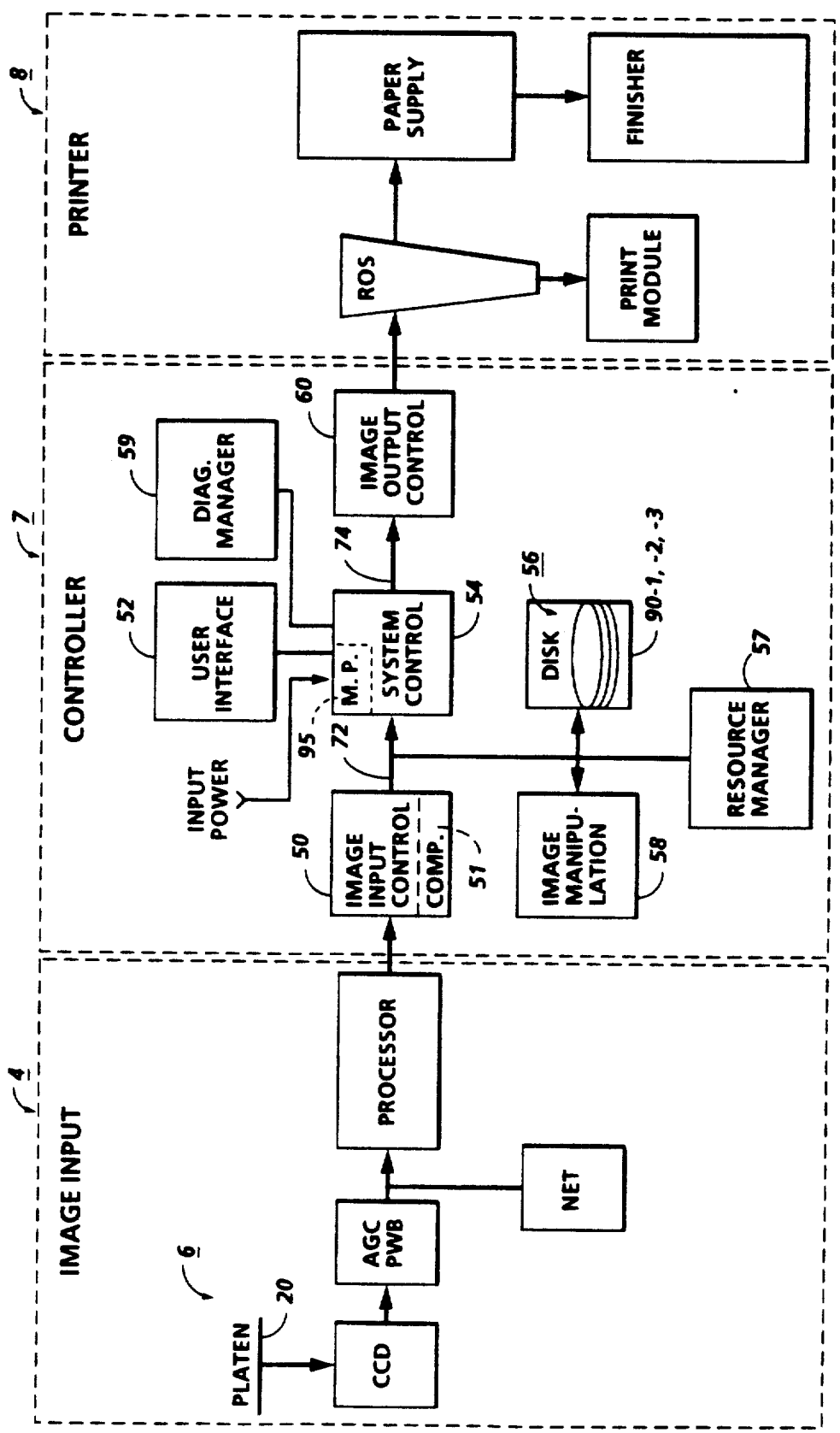
FIG. 2 is a block diagram depicting the major control system elements of the printing system shown in FIG. 1.

Referring to drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and furthermore may be incorporated in electronic display systems, such as CRTs, LCDs, LEDs, etc. or else other image scanning/processing/recording systems, or else other signal transmitting/receiving, recording systems, etc. as well.

A more detailed description of printing system 2 may be found in copending U.S. patent application Ser. No. 07/620,519, filed Nov. 30, 1990, to James R. Graves et al, and entitled "System for Scanning Signature Pages", the disclosure of which is incorporated by reference herein.

Referring to FIG. 2, controller section 7 is, for explanation purposes, divided into an image input controller 50, User Interface (UI) 52, system controller 54, disk memory 56, image manipulation section 58, Resource Manager 57, Diagnostic Manager 59, and image output controller 60.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, visual document facsimile display, programming information and icons, diagnostic information and pictorial views, etc. Items displayed on touchscreen 62 such as files and icons are actuated by either touching the displayed item on screen 62 with a finger or by using mouse 66 to point cursor 67 to the item selected and keying the mouse.

Referring to FIGS. 2 and 3A-3C, the scanned image data input from scanner section 6 to controller section 7 is compressed by image compressor/processor 51 of image input controller 50 on PWB 70-3. The compressed image data with related image descriptors are placed in image files and temporarily stored in system memory 61 pending transfer to external memory 56 where the data is held pending use.

When the compressed image data in memory 56 requires further processing, or is required for display on touchscreen 62 of UI 52, or is required by printer section 8, the data is accessed in memory 56 and transferred to system memory 61. Where further processing other than that provided by processor 25 is required, the data is transferred to image manipulation section 58 on PWB 70-6 where additional processing steps such as collation, make ready (document editing), decomposition, rotation, etc. are carried out. Following processing, the data may be returned to external memory 56, sent to UI 52 for display on touchscreen 62, or sent to image output controller 60.

Resource Manager 57 controls access to disks and RAM 61 of files while diagnostic manager 59 handles system faults.

Image data output to image output controller 60 is decompressed and readied for printing and output to printer section 8. Image data sent to printer section 8 for printing is normally purged from memory 56 to make room for new image data.

As shown in FIGS. 3A-3C, controller section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural application or system processors 78; low speed I/O processor PWB 70-2 having UI communication controller 80 for transmitting data to and from UI 52, Boot Control and LSIO Services Processor 73, and Boot Bus Processor 75; PWBs 70-3, 70-4, 70-5 having disk drive controller/processors 82 with disk drives 83 for transmitting data to and from disks 90-1, 90-2, 90-3 respectively of external memory 56 (image compressor/processor 51 for compressing the image data and another application processor 78 are on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10 having Channel Loader/Scheduler Processor 76, Boot Bus Processor 77, Boot Download Control Logic 79, and Memory Bus Arbitration Logic/Resource Manager 57. As will appear, Loader/Scheduler Processor 76 has two functions, one as a Boot channel to bring the system to the ready state and the other as a scheduler channel used to decide which channel performs which task and in which sequence the tasks will be performed.

For booting, a boot file 129 is replicated on each of the disks 90-1, 90-2, 90-3 for booting system 2. In order to disk boot system 2, the boot software loads the necessary files from the boot disk into memory and enables execution of the software. Since the boot file is replicated on all disks 90-1, 90-2, 90-3, the system can boot from any disk and inform the operator when one disk is not available.

Each independent processor and associated circuitry form a channel 81. Channels 81 (an example is shown in FIG. 3B) are independent processors for handling the applications software, or input/output processors for handling peripheral devices such as disk drives. For example, there are disk channels used to interface disk drives 83 for disks 90-1, 90-2, 90-3, scanner interface channel, printer interface channel, etc.

Memory 56 has plural hard disks 90-1, 90-2, 90-3 on which system files and image files are stored. System files comprise system operating files such as boot files, software files, data files, etc. while image files are typically files of scanned image data.

Internal system memory 61, which comprises a Random Access Memory or RAM, serves as a temporary store for data required during system operations. Memory 61 stores bit of data which can be written to (Data Entered) or read from (Data Used) from the memory. Other data in memory 61 is used for reference and remains loaded as long as power is supplied. Since memory 61 is volatile, that is, all data is lost when power to memory 61 is terminated, Non Volatile Memory or NVM, which essentially comprise RAM memory with battery backup to supply DC voltage when power is turned off, are provided at several locations in the system as, for example, NVM 63 on Low Speed I/O Processor PWB 70-2 (FIG. 3B). NVM 63 is used to store file management updates and file contents updates.

As described in copending U.S. patent application Ser. No. 07/590,634, filed Sep. 28, 1990 now abandoned and refiled as a continuation application on Oct. 15, 1992, with Ser. No. 07/962,166, to George L. Eldridge, and entitled "Method of Operating Disk Drives in Parallel", the disclosure of which is incorporated by reference herein, image files are divided equally into three parts, with successive parts of the files spread equally across disks 90-1, 90-2, 90-3. System files are replicated on each of the disks 90-1, 90-2, 90-3 at the same address.

To keep track of space on disks 90-1, 90-2, 90-3, a file system maintains a record of available disk space together with a record of the space allocated to each system and image file on disks 90-1, 90-2, 90-3. A Volume Allocation Map (VAM) is maintained for each logical disk volume to keep track of blocks of disks 90-1, 90-2, 90-3 that are available for use. The space allocated for each file on disks 90-1, 90-2, 90-3 is maintained by keeping runtables that describe the contiguous extents of a file, the start address of the run with respect to the logical volume, and the length of the run. A file object is also maintained which defines the physical characteristics of the file. The VAM, runtables, and information stored in the file objects are incorporated into a Volume Allocation Table (VAT) 130 shown in FIG. 4.

VAT 130 maintains a record of available space on the logical volume together with file descriptors 132 for every file on the disk volume File descriptors 132 contain information concerning the physical location of the file and the physical characteristics of the file, for example, "logical Disk Address", "Size of Run", Create Date", etc. Also provided are "Version date", which is the date on which VAT 130 was last updated, "Unused VAM Objects", which is a list of free VAM descriptors linked together by the field offset of the next run, "FreeList", which describes the free space in ascending order of logical disk addresses on the specific logical volume, and "Rover", which is used to search for free space on the disks when allocating or de-allocating a file starting at either the beginning of the free list or from the middle of the list as pointed to by the Rover. "AllocFileDate" represents the date the file was allocated to the disks.

A common VAT 130 (identified by numeral 130-1) is provided for all three disks 90-1, 90-2, 90-3. A copy of disk VAT 130-1 is stored on each disk.

Referring also to FIGS. 5-7, on booting of the system, the current VAT 130-1 on the boot disk is read from the boot disk into system memory 61. The VAT 130-2 created in system memory 61 is used to collect file management updates 134 for transfer to the disk VAT 130-1. Updates to VAT 130-2 are frequent since files are continuously being allocated, de-allocated, truncated, and extended during operating of printing system 2. However, frequent write operations to the VATs 130-1 on disks 90-1, 90-2, 90-3 adversely affects the real time performance of the system by consuming disk bandwidth. On the other hand, postponing the write operation to VAT 130-1 exposes the file system to the loss of update information due to unexpected system rollovers, and provides an inconsistent file system.

To obviate this, each file management update 134 to VAT 130-2 in system memory 61 is copied to NVM 63, the updates 134 being arranged in NVM 63 in a FIFO queue 136. The updates 134 are retained in VAT 130-2 instead of being written directly to the disk VATs 130-1 until queue 136 of updates in NVM 63 becomes substantially filled. At this point, the collection of updates 134 held in VAT 130-2 in system memory 61 are written to the disk VATS 130-1. When the transfer of updates 134 is completed and the disk VATs 130-1 made current, the queue 136 of updates 134 in NVM 63 is erased and the process repeated for the next group of updates.

In the event of a system rollover during or between updates requiring re-booting of the system, the boot disk VAT 130-1 is read to system memory 61 during initialization of the operating system and before the application software on the boot disk is accessed. The queue 136 of updates 134 in NVM 63 is accessed and read back to memory 61 to update the VAT 130-2 in system memory. Following updating of the VAT 130-2 in memory 61, the updates are written to disk VATs 130-1 from VAT 130-2 in memory 61. When completed, the queue 136 of updates 134 in NVM 63 discarded.

While the invention has been described with reference to the structure disclosed, it is not confined to the details set forth, but is intended to cover such modifications or changes as may come within the scope of the following claims.

We claim:

1. A process for maintaining file integrity while processing file management updates in an electronic printing system having plural disks providing permanent file storage, a non-volatile memory for storing critical data, random access memory for storing selected system files or parts of system files during operation of said system, and a filing system including a volume allocation table for tracking usage of said disks, copies of said allocation table being provided on each of said disks and in said random access memory, comprising the steps of:

a) inputting file management updates to said allocation table in random access memory;

b) retaining said file management updates temporarily in said allocation table of said random access memory, instead of writing said file management updates directly to said copies of said allocation table on said disks, to avoid the need to write individual file management updates to said copies of said allocation table on said disks as said file management updates occur;

c) copying said file management updates to said non-volatile memory to safeguard against loss of said file management updates in the event said system crashes;

d) arranging said file management update copies in said non-volatile memory in a queue;

e) when said queue of file management updates in said non-volatile memory reaches a predetermined level, writing the current allocation table in said random access memory to said allocation table on said disks to update said disk allocation tables;

f) on completion of step e, erasing said file management updates from said non-volatile memory;

g) repeating steps a-f for subsequent file management updates h) designating one of said disks as a boot disk for booting said printing system to an operating state; and i) in response to a system crash, re-building said allocation table on said disks by:

1) reading the contents in the allocation table on said boot disk to said allocation table in said random access memory, 2) accessing said queue of file management updates in said non-volatile memory, 3) updating said allocation table in random access memory with said file management updates from said non-volatile memory queue, 4) writing said updated allocation table in random access memory to said allocation tables on said disks, and 5) erasing said queue of file management updates from said non-volatile memory.

2. A process for maintaining file integrity while processing file management updates in an electronic printing system in which said printing system has external disk memory for storing system files, a non-volatile memory for retaining critical data, and internal random access memory for holding selected system files or parts of system files during operation of said system, and a filing system for writing file management updates from said internal random access memory to said external disk memory, said filing system including a first allocation table in said external disk memory and a second allocation table in said internal random access memory, comprising the steps of:

a) storing said file management updates in said second allocation table to avoid the need to write individual file management updates to said first allocation table as said file updates occur;

b) providing a copy of each of said file management updates in said non-volatile memory arranged in a queue to prevent loss of said file management updates in the event said system crashes;

c) when said queue of file management updates in said non-volatile memory is substantially filled, transferring said file management updates from said second allocation table to said first allocation table for writing in said external disk memory;

d) on completion of step c, erasing said file management updates from said non-volatile memory;

e) repeating steps a–d for additional file management updates f) in response to a system crash, re-building said first allocation table by:
  1) reading the contents in said first allocation table to said second allocation table,
  2) accessing said queue of file updates in said non-volatile memory,
  3) updating said second allocation table with said file management updates from said non-volatile memory queue,
  4) writing said updated second allocation table to said first allocation table, and
  5) erasing said queue of file management updates from said non-volatile memory.

* * * * *